(12) United States Patent
Kouda et al.

(10) Patent No.: US 6,276,921 B1
(45) Date of Patent: Aug. 21, 2001

(54) CRUSHING APPARATUS FOR PAD MATERIAL

(75) Inventors: Hiroshi Kouda; Shunichi Kitagawa, both of Kanagawa; Takaaki Kikuchi, Tochigi, all of (JP)

(73) Assignee: Ikeda Bussan Co., Ltd., Ayase (JP)

( * ) Notice: Subject to any disclaimer, the term of this patent is extended or adjusted under 35 U.S.C. 154(b) by 0 days.

(21) Appl. No.: 09/326,703

(22) Filed: Jun. 7, 1999

(30) Foreign Application Priority Data

Jun. 8, 1998 (JP) .................................................. 10-175434

(51) Int. Cl.$^7$ ................................................... B29C 67/20
(52) U.S. Cl. .................................. 425/445; 425/DIG. 60
(58) Field of Search ........................... 425/405.1, 405.2, 425/445, 546, DIG. 60, 388, 403.1

(56) References Cited

U.S. PATENT DOCUMENTS

| 4,454,248 | | 6/1984 | Pollock et al. ........................ 521/53 |
| 4,510,268 | | 4/1985 | Tonokawa et al. ................... 521/146 |
| 5,132,063 | * | 7/1992 | Hughes ............................... 264/46.4 |
| 5,232,643 | * | 8/1993 | Purser ................................. 264/46.6 |
| 5,464,337 | * | 11/1995 | Bernardon et al. ................. 425/112 |

FOREIGN PATENT DOCUMENTS 1 530 163   10/1978 (GB).
2 096 616   10/1982 (GB).

* cited by examiner

*Primary Examiner*—Nam Nguyen
*Assistant Examiner*—Donald Heckenberg
(74) *Attorney, Agent, or Firm*—Foley & Lardner

(57) ABSTRACT

A crushing apparatus for crushing closed cells in a pad material which has been molded integral with a frame upon foaming. The crushing apparatus comprises upper and lower counterparts disposed contactable with each other. The upper counterpart includes an upper frame, and an upper sheet-like flexible member secured to the upper frame, and the lower counterpart includes a lower frame which is rotatable around its one side, and a lower sheet-like flexible member secured to the lower frame. The upper and lower sheet-like flexible members are non-air permeable and contactable with each other so as to form an air-tight seal condition between the upper and lower sheet-like flexible members. One of the upper and lower frames has a suction opening which is able to be sealingly connected to a space formed between the upper and lower sheet-like flexible members. An air-sucking device is connected to the suction opening so as to suck air in the space formed between the upper and lower sheet-like members. Additionally, a conveying device is disposed under the lower frame to convey the pad material to be located thereon. In the above crushing apparatus, air in the space is sucked by operating the air-sucking device so as to crush the closed cells in the pad material under a condition where the pad material having the closed cells is placed in the space, and the pad material placed on the lower counterpart is moved to the conveying device upon rotating the lower frame around its one side.

5 Claims, 6 Drawing Sheets

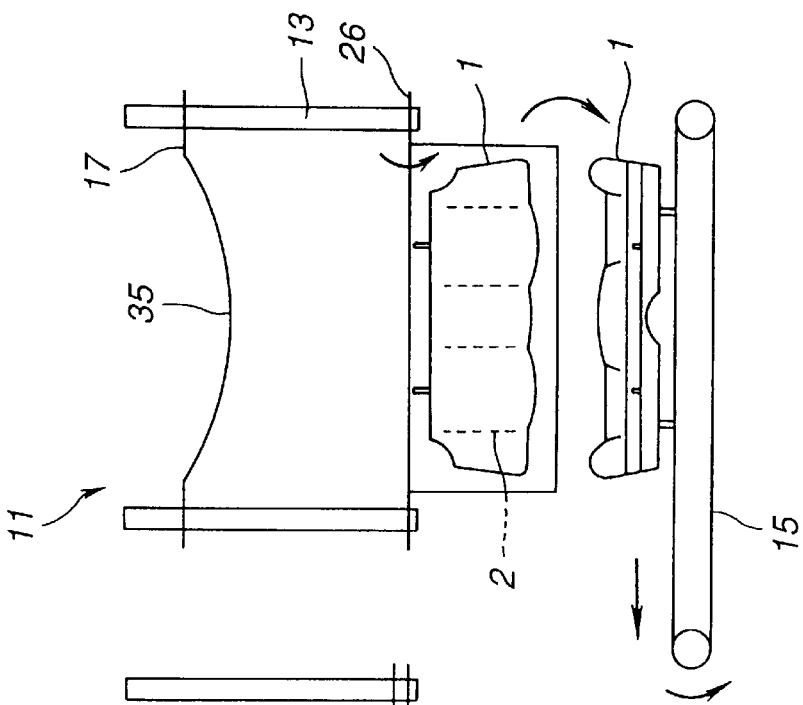
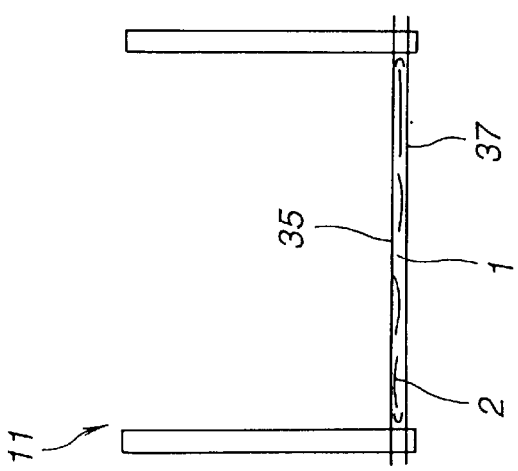
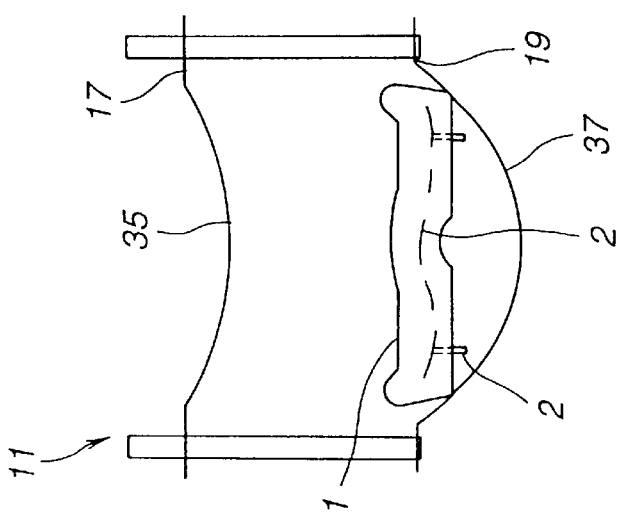

CRUSHING APPARATUS FOR PAD MATERIAL

BACKGROUND OF THE INVENTION

This invention relates to a crushing apparatus for a pad material, and more particularly to the crushing apparatus for a pad material, which can crush closed cells in the pad material under vacuum suction after molding of the pad material having the closed cells.

Hitherto a pad material of a vehicular seat or the like has been formed by foam-molding a synthetic resin such as polyurethane resin or the like. In case that this pad material has closed cells, an operation of crushing the closed cells in the pad material has been made in order to prevent a performance (such as resiliency or the like) of the pad material from lowering owing to contraction of volume of closed cells with temperature lowering. A variety of crushing apparatuses for crushing the closed cells in the pad material has been proposed and put into practical use. For example, with a crushing apparatus as shown in FIG. 7A, the pad material 1' of the vehicular seat or the like is inserted into between crushing rolls 3, 3 disposed up and down, thereby crushing the closed cells in the pad material 1'.

With another crushing apparatus as shown in FIG. 7B, the closed cells in the pad material 1' are crushed as follows: First, the pad material 1' is placed in a vacuum box 5 upon connecting a vacuum mechanism to a suction opening 6 formed at one side of the vacuum box 5. Then, vacuum suction is made through this suction opening 6 thereby expanding the closed cells in the pad material 1'. Additionally, with a further crushing apparatus as shown in FIG. 7C, the closed cells in the pad material 1' are crushed as follows: First, the pad material 1' is placed on a vacuum box jig 8 disposed at a lower side of a vacuum box. Then, the upper part of the pad material 1' is covered with a fabric 9 having no air permeability, disposed over the vacuum box jig 8 upon connecting a vacuum mechanism to a suction opening 10 formed at one side of the vacuum box jig 8. Thereafter, vacuum suction is made through this suction opening 10.

In connection with the above crushing apparatus shown in FIG. 7A, there has been a case where the above-mentioned pad material 1' is foam-molded integral with a seat frame formed of a wire frame or the like. In this case, when the pad material 1' is inserted into between the crushing rolls 3, 3 disposed up and down, there arises the fear of the seat frame formed of the wire frame or the like to be formed integral with the foam-molded pad material 1' being bent or deformed.

Additionally, in connection with the crushing apparatus as shown in FIG. 7B, in a case where vacuum suction is made through the suction opening 6 at one side of the vacuum box 5 upon storing the pad material 1' in the vacuum box 5, it is difficult to crush the closed cells in the pad material 1' so that a sufficient crushing effect cannot be obtained on the closed cells in the pad material 1'.

Further, in connection with the crushing apparatus as shown in FIG. 7C, in a case where the fabric 9 having no air permeability and disposed above the vacuum box jig 8 is covered on the upper part of the pad material 1' upon placing the pad material 1' on the vacuum box jig 8, it is required to provide such a shape as to correspond to the external shape of the pad material 1' to the surface of the vacuum box jig 8. This complicates production of the vacuum box jig 8, thereby providing a defect of making a cost-up. Additionally, there is the fear of rubbing being made between the fabric 9 and the pad material 1' thereby generating static electricity.

BRIEF SUMMARY OF THE INVENTION

It is an object of the present invention to provide an improved crushing apparatus for a pad material, which can effectively overcome drawbacks encountered in conventional crushing apparatuses.

Another object of the present invention is to provide a crushing apparatus for a pad material, which can improve a crushing effect on closed cells in the pad material while avoiding the fear of a frame such as a seat frame being bent and deformed even in a case where the frame is foam-molded integral with the pad material, and preventing production cost from rising.

A further object of the present invention is to provide an improved crushing apparatus for a pad material, which can avoid the fear of static electricity being generated during making a vacuum suction while making it unnecessary to form a vacuum box jig in accordance with the shape of the pad material, making it possible to reduce the number of production steps and operational steps so as to accomplish an automation and a cost-down for the pad material.

An aspect of the present invention resides in a crushing apparatus for crushing closed cells in a pad material. The crushing apparatus comprises first and second counterparts disposed contactable with each other. The first counterpart includes a first frame, and a first sheet-like flexible member secured to the first frame, and the second counterpart includes a second frame, and a second sheet-like flexible member secured to the second frame. The first and second sheet-like flexible members are non-air permeable and contactable with each other so as to form an air-tight seal condition between the first and second sheet-like flexible members. One of the first and second frames having a suction opening which is able to be sealingly connected to a space formed between the first and second sheet-like flexible members. Additionally, an air-sucking device connected to the suction opening so as to suck air in the space formed between the first and second sheet-like members. In the above crushing apparatus, air in the space is sucked by operating the air-sucking device under a condition where the pad material having the closed cells is placed in the space.

Another aspect of the present invention resides in a crushing apparatus for crushing closed cells in a pad material which is formed integral with a frame upon foaming. The crushing apparatus comprises first and second counterparts disposed contactable with each other. The first counterpart includes a first frame, and a first sheet-like flexible member secured to the first frame, and the second counterpart includes a second frame, and a second sheet-like flexible member secured to the second frame. The first and second sheet-like flexible members are non-air permeable and contactable with each other so as to form an air-tight seal condition between the first and second sheet-like flexible members. One of the first and second frames having a suction opening which is able to be sealingly connected to a space formed between the first and second sheet-like flexible members. Additionally, an air-sucking device is connected to the suction opening so as to suck air in the space formed between the first and second sheet-like members. In the above crushing apparatus, air in the space is sucked by operating the air-sucking device so as to crush the closed cells in the pad material under a condition where the pad material having the closed cells is placed in the space.

A further aspect of the present invention resides in a crushing apparatus for crushing closed cells in a pad material. The crushing apparatus comprises first and second counterparts disposed contactable with each other. The first counterpart includes a first frame, and a first sheet-like flexible member secured to the first frame, and the second counterpart includes a second frame which is rotatable around its one side, and a second sheet-like flexible member secured to the second frame. The first and second sheet-like flexible members are non-air permeable and contactable with each other so as to form an air-tight seal condition between the first and second sheet-like flexible members. One of the first and second frames has a suction opening which is able to be sealingly connected to a space formed between the first and second sheet-like flexible members. An air-sucking device is connected to the suction opening so as to suck air in the space formed between the first and second sheet-like members. A conveying device is disposed under the second frame to convey the pad material to be located thereon. In the above crushing apparatus, air in the space is sucked by operating the air-sucking device so as to crush the closed cells in the pad material under a condition where the pad material having the closed cells is placed in the space, and the pad material placed on the second counterpart is moved to the conveying device upon rotating the second frame around its one side.

A further aspect of the present invention resides in a crushing apparatus for crushing closed cells in a pad material which is molded integral with a frame upon foaming. The crushing apparatus comprises first and second counterparts disposed contactable with each other. The first counterpart includes a first frame, and a first sheet-like flexible member secured to the first frame, and the second counterpart includes a second frame which is rotatable around its one side, and a second sheet-like flexible member secured to the second frame, the first and second sheet-like flexible members being non-air permeable and contactable with each other so as to form an air-tight seal condition between the first and second sheet-like flexible members, one of the first and second frames having a suction opening which is able to be sealingly connected to a space formed between the first and second sheet-like flexible members. An air-sucking device is connected to the suction opening so as to suck air in the space formed between the first and second sheet-like members. Additionally, a conveying device is disposed under the second frame to convey the pad material to be located thereon. In the above crushing apparatus, air in the space is sucked by operating the air-sucking device so as to crush the closed cells in the pad material under a condition where the pad material having the closed cells is placed in the space, and the pad material placed on the second counterpart is moved to the conveying device upon rotating the second frame around its one side.

According to the present invention, the crushing apparatus for a pad material can effectively improve a crushing effect on closed cells in the pad material while avoiding the fear of the wire frame serving as a seat frame being bent and deformed even in a case where the wire frame serving as the seat frame is foam-molded integral with the pad material. The crushing apparatus further avoids the fear of static electricity being generated during making a vacuum suction and making it unnecessary to form a vacuum box jig in accordance with the shape of the pad material thereby reducing the number of production steps and operational steps. This can accomplish automation of crushing operation for the closed cells while lowering production cost of the pad material.

BRIEF DESCRIPTION OF THE DRAWINGS

FIG. 6A is a schematic illustration showing an operational mode of the crushing apparatus of FIG. 1;

FIG. 6B is a schematic illustration showing another operational mode of the crushing apparatus, following the operational mode in FIG. 6A;

FIG. 6C is a schematic illustration showing a further operational mode of the crushing apparatus, following the operational mode of FIG. 6B;

DETAILED DESCRIPTION OF THE INVENTION

Figure 1:
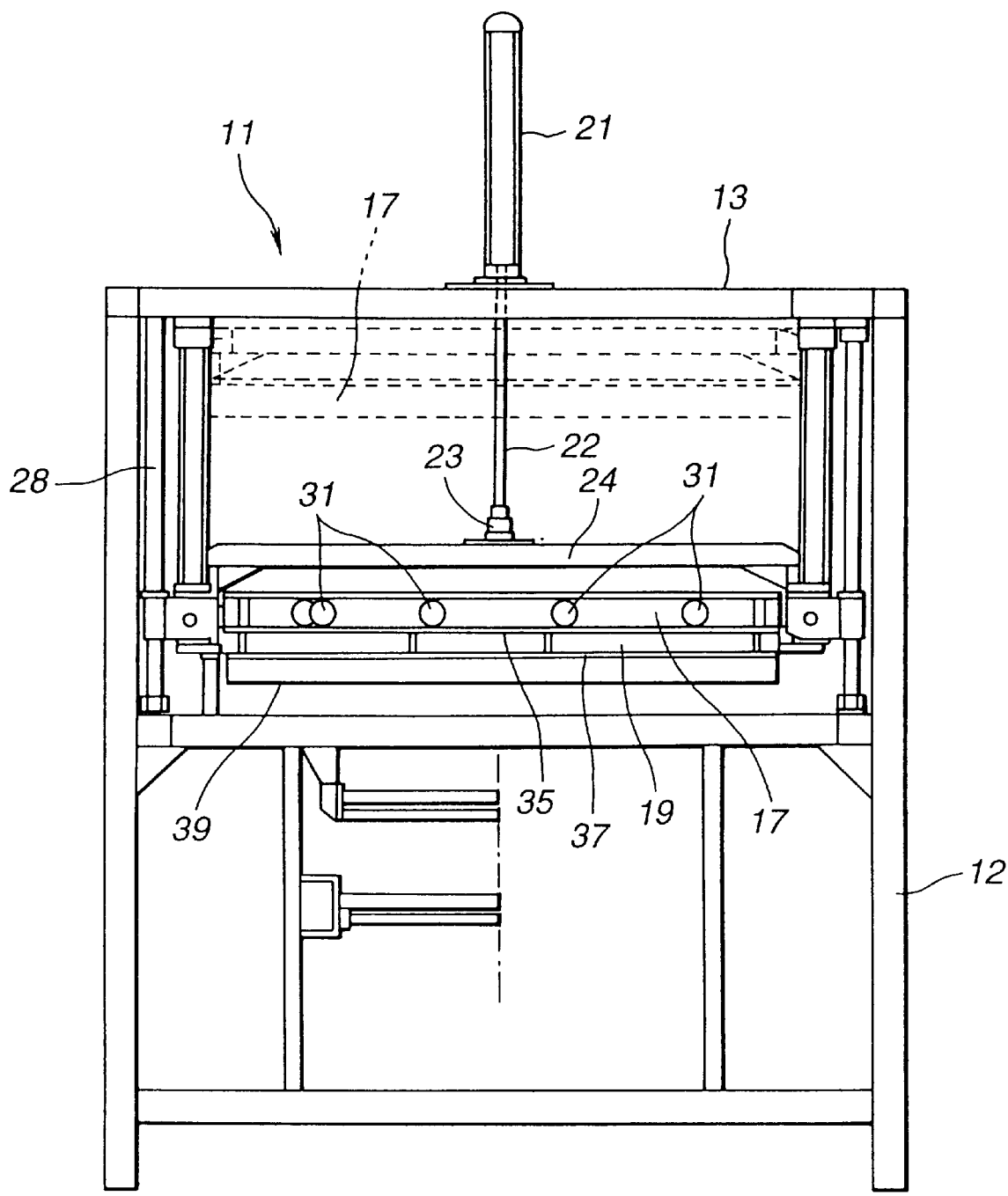
FIG. 1 is a front elevation of an embodiment of a crushing apparatus for a pad material, according to the present invention.
Figure 2:
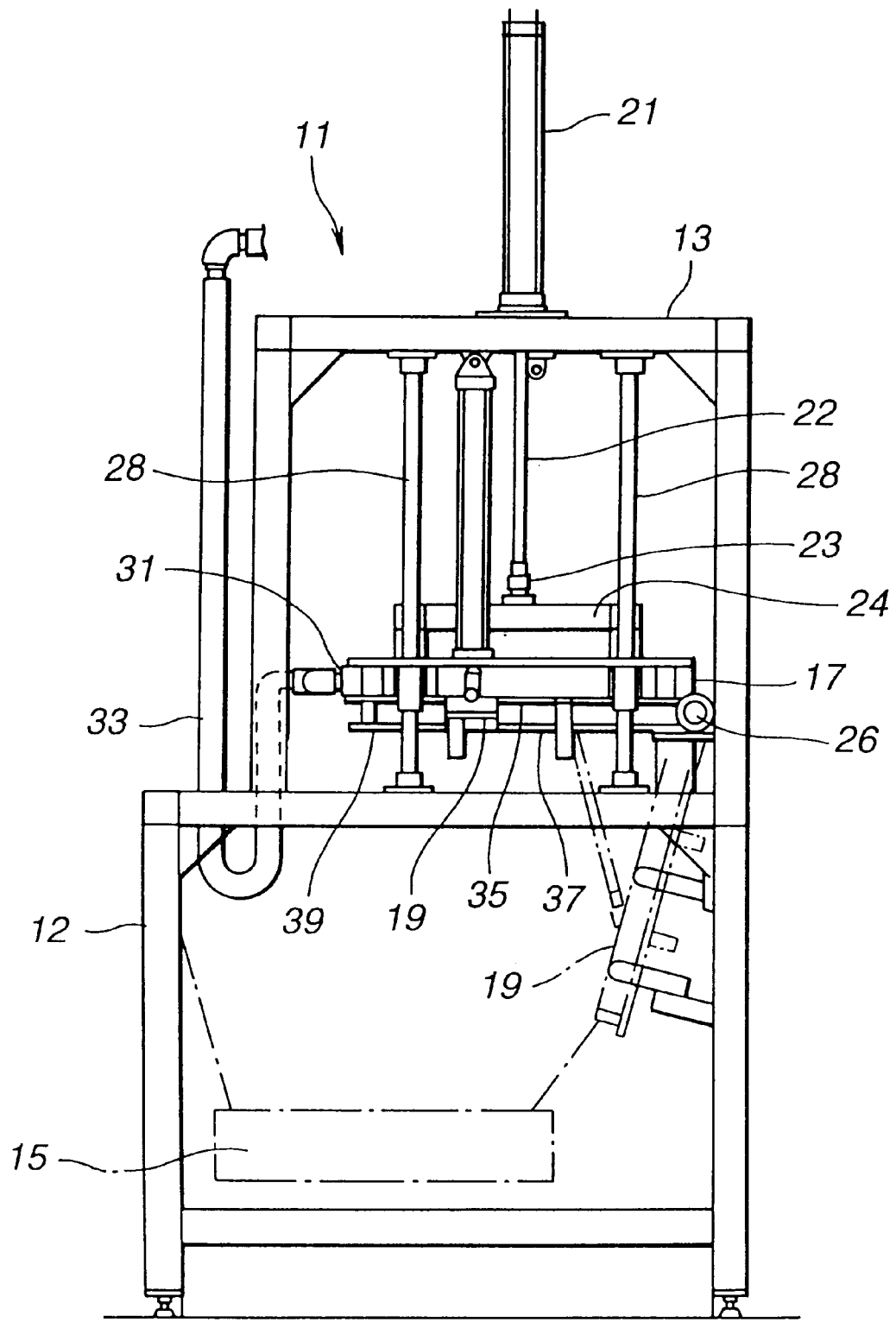
FIG. 2 is a side elevation of the crushing apparatus of FIG. 1.
Figure 3:
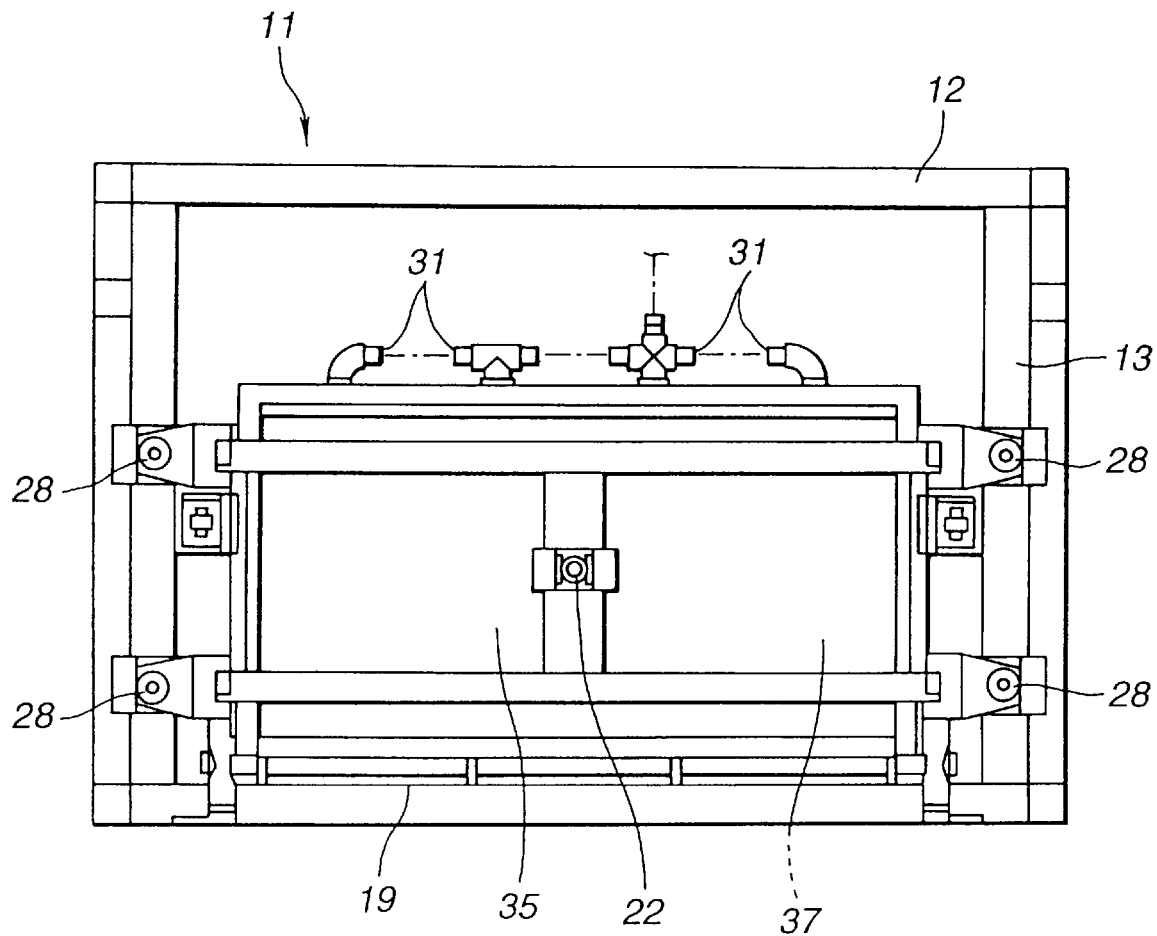
FIG. 3 is a plan view of the crushing apparatus of FIG. 1.

Referring now to FIGS. 1 to 3 of the drawings, an embodiment of a crushing apparatus for a pad material 1, according to the present invention is illustrated by the reference numeral 11. In this embodiment, the pad material 1 is a seat cushion of a vehicular seat, and formed of a polyurethane foam. It will be understood that the principle of the present invention may be applied to other pad materials for a variety of purposes. The crushing apparatus 11 comprises a lower base stand 12 on which an upper base stand 13 is fixedly mounted. An one end section of a belt conveyer 15 serving as a conveying device is inserted inside the lower base stand 13. A pair of upper and lower frames 17, 19 are provided in the upper base stand. The upper frame 17 forms part of an upper counterpart (no numeral), while the lower frame 19 forms part of a lower counterpart (no numeral).

The upper frame 17 is disposed vertically movable under the action of an air cylinder 21 which projects upwardly from the upper end of the upper base stand 13. The air cylinder 21 has a piston rod 22 which is vertically movable. An installation member 24 is attached through a floating joint 23 to the lower end of the piston rod 22. The upper frame 17 is installed to the installation member 24. The reference numerals 28 denote guide rods along which the upper frame 17 is vertically movable.

The above-mentioned lower frame 19 is pivotally connected to the lower base stand 12 and pivotally movable around a pivot shaft 26. The lower frame 19 normally maintains its horizontal state to be parallel with the upper frame 17, in which the lower frame 19 is in close contact with the upper frame 17 maintaining an air-tight seal between the lower and upper frames 19, 17.

Suction openings 32 are formed in either one of the above-mentioned two frames 17, 19. In this embodiment, the suction openings 32 are formed in the upper frame 17. As shown in FIG. 2, a vacuum valve (not shown) of an air-sucking device or vacuum mechanism (not shown) is connected to the suction opening 31 through a flexible pipe 33. The vacuum mechanism may be connected to the lower frame 19 in case where the suction openings 32 are formed in the lower frame 19.

Figure 4:
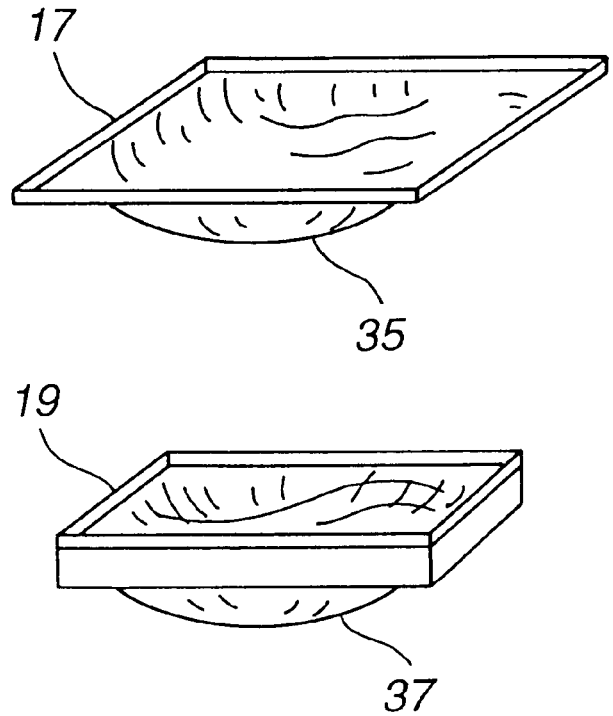
FIG. 4 is a perspective view of an essential part of the crushing apparatus of FIG. 1.

As shown in FIG. 4, upper and lower sheet-like flexible members 35, 37 having no air permeability are respectively fixedly secured to the above-mentioned upper and lower frames 17, 19 in such a manner to extend to cover the inside opening defined by each frame 17. Accordingly, each flexible member 35, 37 is formed larger in size than the inside opening defined by the corresponding frame 17, 19. Preferably, the flexible member 35, 37 is sufficiently large so that downward slacking is formed in the flexible member. A support member 39 is disposed below the flexible member 37 installed to the lower frame 19 in order to support the pad material 1.

Figure 5:
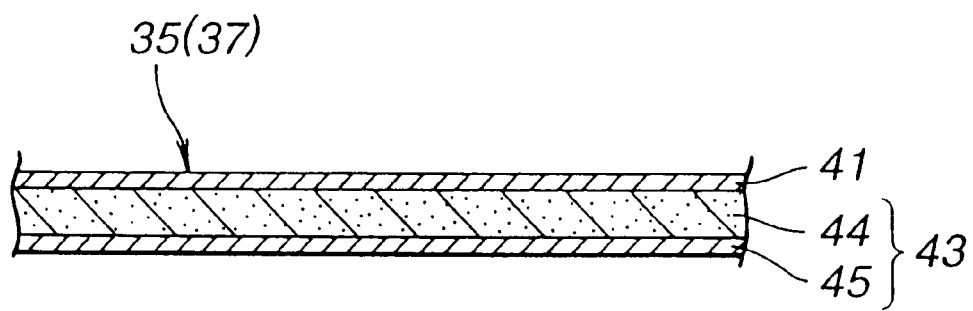
FIG. 5 is fragmentary vertical sectional view of each sheet-like flexible member used in the essential part of FIG. 4.
Figure 7A:
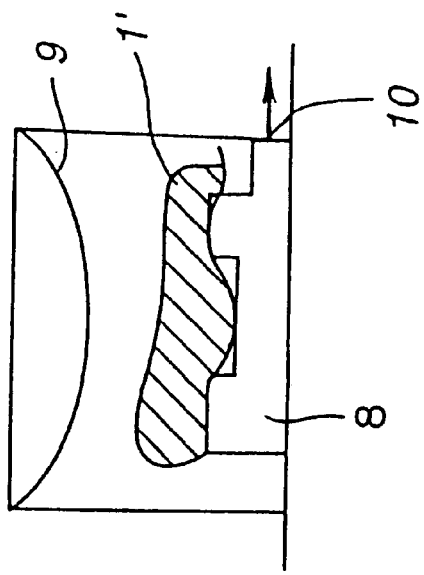
FIG. 7A is a schematic illustration of a conventional crushing apparatus for a pad material.
Figure 7B:
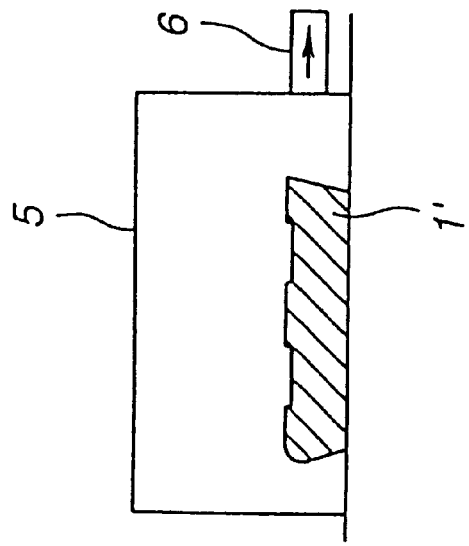
FIG. 7B is a schematic illustration of another conventional crushing apparatus for a pad material.
Figure 7C:
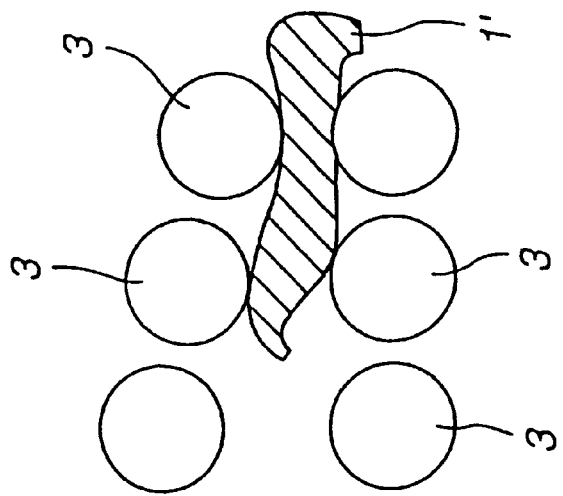
FIG. 7C is a schematic illustration of a further conventional apparatus for a pad material.

As shown in FIG. 5, each of upper and lower sheet-like flexible members 35, 37 having no air-permeability is formed of a laminate including a fabric 41 having no air permeability, and a skin material 43 having an air permeability. The fabric 41 is coated at its surface with rubber, synthetic resin or the like so as to have the no air permeability. The skin material 43 includes a cushion layer 44 formed of a so-called slab-urethane foam (or a low density polyurethane foam) or the like having an air permeability, and a fabric 45 or the like having an air permeability and an electrical conductivity.

Since the skin material 43 having the air permeability is laminated on the fabric 41 having no air-permeability, there is no fear of sucking action and crushing action for the pad material 1 being obstructed even if the flexible members 35, 37 are brought into tight contact with the pad material 1. Accordingly, the pad material 1 can be effectively sucked under the action of the skin material 43 having the air permeability, thereby improving the sucking action and the crushing action. Each flexible member 35, 37 may be formed of only the fabric 41 or the like coated with rubber or the like having no air permeability.

Next, a manner of operation of the crushing apparatus 11 according to the present invention will be discussed with reference to FIGS. 6A to 6C.

First, as shown in FIG. 6A, the piston rod 22 of the air cylinder 21 is ascended thereby raising the upper frame 17 so that the distance between the upper and lower frames 17, 19 increases. Then, the pad material 1 is placed on the flexible member 37 of the lower frame 19. This pad material 1 has been foamed and molded integral with a wire frame (or a seat frame) 2, and contains closed cells. Placing the pad material 1 on the flexible member 37 is carried out immediately after the pad material 1 has been foamed and molded, i.e., within a time in which the pad material 1 has been still warm.

Subsequently, as shown in FIG. 6B, the piston rod 22 of the air cylinder 21 is descended to lower the upper frame 17. Then, the upper and lower frames 17, 19 are brought into tight contact with each other so as to form a space (no numeral) defined between the upper and lower frames 17, 19, the space being able to maintain its air-tight seal. The pad material 1 is located in the space. Then, the vacuum mechanism connected through the pipe 33 to the suction openings 31 is operated, in which the suction openings 31 are sealingly connected to the space in which the pad material 1 is located. Accordingly, the pad material 1 located in the space is compressed by the upper and lower sheet-like flexible members 35, 37.

This compressing is repeatedly made five to six times per 30 seconds, at a compression pressure of 1 kg/cm$^2$ by operating the air cylinder 21. At this time, the closed cells in the pad material 1 are crushed to allow gas within the closed cells to release.

Subsequently, as shown in FIG. 6C, the piston rod 22 of the air cylinder 21 is ascended to raise the upper frame 17 thereby enlarging the distance between the upper and lower frames 17, 19. Then, the lower frame 19 is pivotally rotated around the pivot shaft 26, so that the pad material 1 placed on the flexible member 37 of the lower frame 19 is automatically moved onto the belt conveyer 15 serving as the conveying device. Thus, the pad material 1 is transferred to a subsequent process for producing the vehicular seat.

As appreciated from the above, according to the crushing apparatus according to the present invention, a crushing effect on closed cells in the pad material can be effectively improved while avoiding the fear of the wire frame serving as a seat frame being bent and deformed even in a case where the wire frame serving as the seat frame is foam-molded integral with the pad material. Additionally, the fear of static electricity being generated during making a vacuum suction can be avoided making it unnecessary to form a vacuum box jig in accordance with the shape of the pad material thereby reducing the number of production steps and operational steps. This can accomplish automation of crushing operation for the closed cells while lowering production cost of the pad material.

What is claimed is:

1. A crushing apparatus for crushing closed cells in a pad material, comprising:

first and second counterparts disposed contactable with each other, said first counterpart including a first frame, and a first flexible sheet member secured to said first frame, said second counterpart including a second frame which is rotatable around its one side, and a second flexible sheet member secured to said second frame, said first and second flexible sheet members being non-air permeable and contactable with each other so as to form an air-tight seal condition between said first and second flexible sheet members, one of said first and second frames having a suction opening which is able to be sealingly connected to a space formed between said first and second flexible sheet members;

an air-sucking device connected to said suction opening so as to suck air from the space formed between said first and second flexible sheet members; and a conveying device disposed under said second frame to convey the pad material to be located thereon;

wherein air in the space is sucked by operating said air-sucking device so as to crush the closed cells in the pad material under a condition where the pad material having the closed cells is placed in the space, and the pad material placed on the second counterpart is moved to said conveying device upon rotating said second frame around its one side.

2. A crushing apparatus for crushing closed cells in a pad material which is molded integral with a frame upon foaming, comprising:

first and second counterparts disposed contactable with each other, said first counterpart including a first frame, and a first flexible sheet member secured to said first frame, said second counterpart including a second frame which is rotatable around its one side, and a second flexible sheet member secured to said second frame, said first and second flexible sheet members being non-air permeable and contactable with each other so as to form an air-tight seal condition between said first and second flexible sheet members, one of said first and second frames having a suction opening which is able to be sealingly connected to a space formed between said first and second flexible sheet members;

an air-sucking device connected to said suction opening so as to suck air from the space formed between said first and second flexible sheet members; and a conveying device disposed under said second frame to convey the pad material to be located thereon;

wherein air in the space is sucked by operating said air-sucking device so as to crush the closed cells in the pad material under a condition where the pad material having the closed cells is placed in the space, and the pad material placed on the second counterpart is moved to said conveying device upon rotating said second frame around its one side.

3. A crushing apparatus as claimed in claim 1, wherein each of said first and second flexible sheet members includes a fabric having non-air permeability, and a skin material having air permeability, laminated on a surface of said fabric.

4. A crushing apparatus as claimed in claim 3, wherein said skin material includes a cushion layer, and a fabric having an electrical conductivity.

5. A crushing apparatus as claimed in claim 1, wherein each flexible sheet member is fixedly attached to each frame to be extended over an inside opening defined by said frame.

* * * * *